United States Patent
Sobala et al.

(10) Patent No.: US 11,922,279 B2
(45) Date of Patent: Mar. 5, 2024

(54) STANDARD ERROR OF PREDICTION OF PERFORMANCE IN ARTIFICIAL INTELLIGENCE MODEL

(71) Applicant: International Business Machines Corporation, Armonk, NY (US)

(72) Inventors: Wojciech Sobala, Cracow (PL); Rafal Bigaj, Cracow (PL); Lukasz G. Cmielowski, Cracow (PL); Maksymilian Erazmus, Zasów (PL)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 16/899,693

(22) Filed: Jun. 12, 2020

(65) Prior Publication Data

US 2021/0390446 A1 Dec. 16, 2021

(51) Int. Cl.
| | | |
|---|---|---|
| *G06F 17/18* | (2006.01) | |
| *G06F 17/10* | (2006.01) | |
| *G06F 17/15* | (2006.01) | |
| *G06N 7/00* | (2023.01) | |
| *G06N 20/00* | (2019.01) | |
| *G06N 20/10* | (2019.01) | |

(52) U.S. Cl.
CPC ............. *G06N 20/00* (2019.01); *G06F 17/10* (2013.01); *G06N 7/00* (2013.01)

(58) Field of Classification Search
CPC ........... G06N 20/00; G06N 7/00; G06F 17/10
See application file for complete search history.

(56) References Cited

U.S. PATENT DOCUMENTS

| | | | |
|---|---|---|---|
| 9,208,463 B1 | 12/2015 | Bhide | |
| 10,402,512 B2 | 9/2019 | Jou | |
| 2008/0215400 A1 | 9/2008 | Ban | |
| 2009/0281845 A1 | 11/2009 | Fukuda | |
| 2012/0072029 A1* | 3/2012 | Persaud | G06N 5/04 706/54 |
| 2013/0095459 A1* | 4/2013 | Tran | G09B 19/00 434/247 |
| 2013/0226842 A1* | 8/2013 | Chu | G06N 5/025 706/12 |
| 2013/0262096 A1* | 10/2013 | Wilhelms-Tricarico | G10L 13/04 704/207 |

(Continued)

FOREIGN PATENT DOCUMENTS

CN 108205520 A 6/2018

*Primary Examiner* — Brandon S Cole
(74) *Attorney, Agent, or Firm* — Monchai Chuaychoo

(57) ABSTRACT

An approach for selecting a transformed prediction model for estimating the uncertainty of prediction associated with machine learning is disclosed. The approach determines a function corresponding to a prediction interval based on one or more datasets and calculates one or more sets of prediction interval parameters associated with the function based on training a set of regression models with the one or more datasets. The approach creates one or more transformed predictions based on the one or more sets of parameters and based on a logical distance and selects a transformed prediction model based on a mean absolute correlation from the one or more transformed predictions. Furthermore, the approach outputs the selected transformed prediction model.

20 Claims, 4 Drawing Sheets

(56) References Cited

U.S. PATENT DOCUMENTS

| | | | |
|---|---|---|---|
| 2015/0081398 A1* | 3/2015 | Dorai | G06Q 10/06375 |
| | | | 705/7.37 |
| 2015/0379429 A1 | 12/2015 | Lee | |
| 2017/0147681 A1* | 5/2017 | Tankersley | G06F 11/321 |
| 2018/0103302 A1* | 4/2018 | Bell | G01R 35/00 |
| 2018/0227930 A1 | 8/2018 | Ouyang | |
| 2019/0236497 A1 | 8/2019 | Santos | |
| 2019/0266725 A1* | 8/2019 | Zalev | A61B 5/7225 |
| 2019/0282823 A1* | 9/2019 | Freeman | A61N 1/3968 |
| 2020/0251213 A1* | 8/2020 | Tran | G06N 20/00 |
| 2021/0390446 A1* | 12/2021 | Sobala | G06N 20/00 |

\* cited by examiner

STANDARD ERROR OF PREDICTION OF PERFORMANCE IN ARTIFICIAL INTELLIGENCE MODEL

BACKGROUND

The present invention relates generally to software, and more particularly to a method for calculating standard error of prediction as it related to performance of an AI (Artificial Intelligence) model.

Machine learning algorithms (i.e., autonomously) build a mathematical model based on sample data, (i.e., "training data"), in order to make predictions or decisions without being programmed. Mathematical models built are not perfect and entirely accurate. The models can have uncertainty in them. These models can be used to explain real world phenomena (e.g., quantum mechanics, etc.) or use in economic prediction (e.g., stock market, business demand, etc.). There are many sources of uncertainty, such as variance in the specific data values, the sample of data collected from the domain, and in the imperfect nature of any models developed from such data.

SUMMARY

Aspects of the present invention disclose a computer-implemented method, an apparatus and computer program product for training a recurrent neural network to create a model for anomaly detection in the topology of a network. The computer implemented method may be implemented by one or more computer processors and may include determining a function corresponding to a prediction interval based on one or more datasets; calculating one or more sets of prediction interval parameters associated with the function based on training a set of regression models with the one or more datasets; creating one or more transformed predictions based on the one or more sets of parameters and based on a logical distance; selecting a transformed prediction model based on a mean absolute correlation from the one or more transformed predictions; and outputting the selected transformed prediction model.

In an embodiment, the computer program product may include one or more non-transitory computer readable storage media and program instructions stored on the one or more non-transitory computer readable storage media, the program instructions comprising: program instructions to determine a function corresponding to a prediction interval based on one or more datasets; program instructions to calculate one or more sets of prediction interval parameters associated with the function based on training a set of regression models with the one or more datasets; program instructions to create one or more transformed predictions based on the one or more sets of parameters and based on a logical distance; program instructions to select a transformed prediction model based on a mean absolute correlation from the one or more transformed predictions; and program instructions to output the selected transformed prediction model.

In another embodiment, the computer system includes one or more computer processors; one or more computer readable storage media; program instructions stored on the one or more computer readable storage media for execution by at least one of the one or more computer processors, the program instructions comprising: program instructions to determine a function corresponding to a prediction interval based on one or more datasets; program instructions to calculate one or more sets of prediction interval parameters associated with the function based on training a set of regression models with the one or more datasets; program instructions to create one or more transformed predictions based on the one or more sets of parameters and based on a logical distance; program instructions to select a transformed prediction model based on a mean absolute correlation from the one or more transformed predictions; and program instructions to output the selected transformed prediction model.

BRIEF DESCRIPTION OF THE DRAWINGS

Preferred embodiments of the present invention will now be described, by way of example only, with reference to the following drawings, in which.

DETAILED DESCRIPTION

Figure 1:
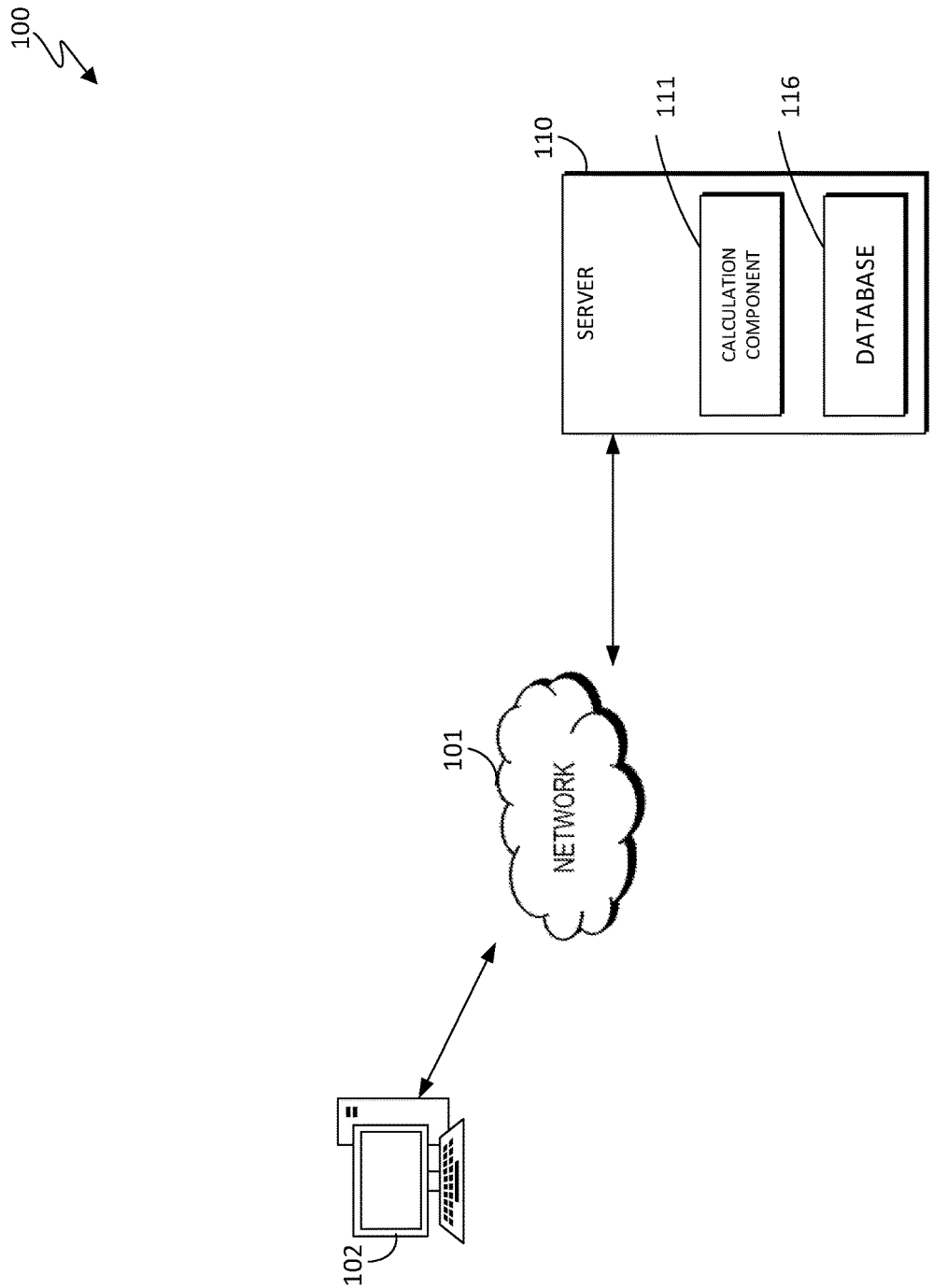
FIG. 1 is a functional block diagram illustrating a regression function model environment, designated as 100, in accordance with an embodiment of the present invention.

Embodiments of the present invention provides an approach for calculating standard error of prediction associated with models by machine learning. Typically, in building an AI (artificial intelligence) model to mimic a business process, feedback data is not available to monitor the performance of the model. Thus, a set of model metrics are introduced, which are based on established prediction accuracy measures (prediction intervals). Metrics like confidence and uncertainty are easy to develop for classification models. However, some regression model does not have the probability of the predicted value available. Thus, due to the lack of the predicted value, gauging the performance of the model can be difficult. Confidence and uncertainty of prediction are strictly based on prediction probability. Embodiment allows for that calculation for standard error of prediction and it is based on estimated error formulas (calculated using variety set of regression models and datasets).

One embodiment can calculate the standard error of prediction without access to training data. For example, a customer does not wish to make the training data available. Normally, training data is required to calculate the standard error of prediction (i.e., a common measure of prediction precision).

Other embodiment can monitor, via KPI (Key Performance Indicator), the impact of machine learning model predictions on various business processes. Forecasting of KPIs may be an important knowledge asset for a business. The embodiment can solve the problem of pushing new AI model version to production and forecasting impact to the business.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

FIG. 1 is a functional block diagram illustrating a regression function model environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Regression function model environment 100 includes network 101, client server 102 and server 110.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110, client server 102 and other computing devices (not shown) within regression function model environment 100. It is noted that other computing devices can include, but is not limited to, client server 102 and any electromechanical devices capable of carrying out a series of computing instructions.

Server 110 and client server 102 can be a standalone computing device, a management server, a web server, a mobile computing device, or any other electronic device or computing system capable of receiving, sending, and processing data. In other embodiments, server 110 and client server 102 can represent a server computing system utilizing multiple computers as a server system, such as in a cloud computing environment. In another embodiment, server 110 and client server 102 can be a laptop computer, a tablet computer, a netbook computer, a personal computer (PC), a desktop computer, a personal digital assistant (PDA), a smart phone, or any other programmable electronic device capable of communicating other computing devices (not shown) within regression function model environment 100 via network 101. In another embodiment, server 110 and client server 102 represents a computing system utilizing clustered computers and components (e.g., database server computers, application server computers, etc.) that act as a single pool of seamless resources when accessed within regression function model environment 100.

Client server 102 can be a website for vendors offering products and/or services to the general consumer.

Embodiment of the present invention can reside on server 110. Server 110 includes calculation component 111 and database 116.

Calculation component 111 provides the capability of calculating standard error of prediction associated with models by machine learning. Calculation components include the following sub-components: i) function fitting to datasets, ii) prediction interval function, iii) consolidate functions and iv) select best transformation.

Database 116 is a repository for data used by calculation component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within regression function model environment 100, provided that calculation component 111 has access to database 116. Database 116 may store information associated with, but is not limited to, regression equations and functions, regression models, benchmark datasets and testing datasets associated with models.

Figure 2:
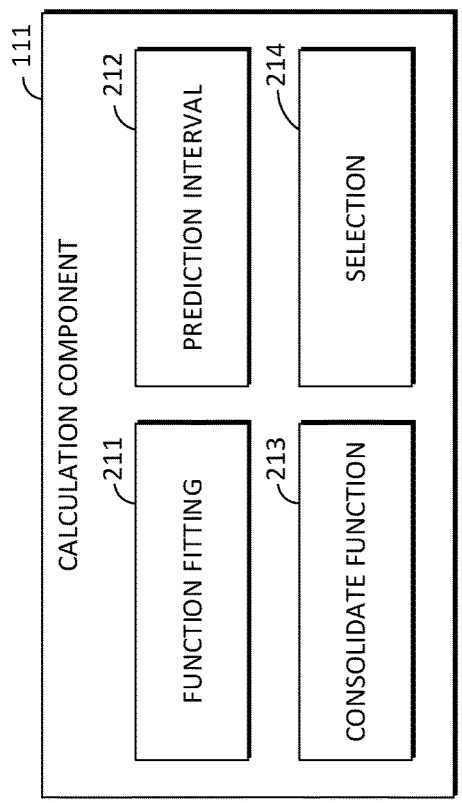
FIG. 2 is a functional block diagram illustrating calculation component 111, designated as 200, in accordance with an embodiment of the present invention.

FIG. 2 is a functional block diagram illustrating calculation component 111 in accordance with an embodiment of the present invention. In the depicted embodiment, calculation component 111 includes function fitting component 211, prediction interval component 212, consolidate function component 213 and selection component 214.

As is further described herein below, function fitting component 211 of the present invention provides the capability of best fitting functions (e.g., mathematical, etc.) to a sample dataset (used by machine learning). Function fitting component 211 determines the best function that fits the prediction intervals for known datasets using any existing methods such as, Bayesian, Mean-Variance Estimation or Bootstrap. For example, using known general function such as, a polynomial or a square root, function fitting component 211 would check those functions against known and/or available datasets that fit best to a prediction interval. Datasets from Kaggle competitions can be used if none are available. An exit criterion such as, a mean square formula, can be used during the function fitting process to indicate the best fit function. The best function would be the function type that can provide a lower mean square error. In case of a computation limitation during the function fitting process where the use of an exit criteria is not feasible, then a default square root, can be always used (as an exit criterion):

$$y = ax^2 + bx + \theta x + c$$

where, x is model prediction, θ is term with fixed coefficient equal 1. It is noted that the term "sample datasets" can be used interchangeably with the term, "training dataset." Training dataset is defined as a dataset belonging to customers that may contain sensitive information (or have not been scrubbed to remove such information). A "benchmark dataset" is a combination of available open datasets for regression problem.

As is further described herein below, prediction interval component 212 of the present invention provides the capability of determining values of parameters used by the prediction interval function. Embodiment can use a simulation approach by training set of regression models on top of benchmarking dataset to estimate function parameters: a, b, c (in case of square or root square function). A benchmarking dataset is a combination of available open datasets for regression problem. The benchmarking dataset is normalized to provide target values at the same scale. For each dataset, being part of benchmarking dataset, embodiment selects the best regression model. As a result of simulation series run, embodiment has k-regression models trained where k is number of datasets making benchmarking dataset. From each trained regression model, embodiment extract regression function parameters: a, b, c. After the extraction, the values will have k such triples (see Table 1).

TABLE 1

| Index | a | b | c |
|---|---|---|---|
| 1 | 1.3 | 2 | 0.8 |
| 2 | 1.1 | 2.5 | 0.7 |
| . | . | . | . |
| k | | | |

As is further described herein below, consolidate function component 213 of the present invention provides the capability of selecting the possible candidates of function from a set of regression models based on i) function fitting component 211 and ii) prediction interval component 212. Consolidate function component 213 consists of three major steps: 1) transforming the generated values, 2) calculate correlation matrix and 3) apply clustering on the transformed data.

Transforming the Generated Values (Step 1)
Transform generated values (default n=100) from standardized range (0-1) using coefficients a, b and c (omitting offset term).

Calculate Correlation Matrix (Step 2)
Calculate correlation matrix for transformed predictions using all k triples.

Apply Clustering on Transformed Data (Step 3)
Apply medoid clustering on transformed data.

For example, step 1 attempts to fit various functions against multiple datasets. Thus, there are multiple models (and its parameter, such as a, b, and c) that must be used before finding the best function. The data used in step 1 are transformed prediction errors and predictions (one feature and one target). Calculation component 111 is modeling transformed prediction error using predicted values and is fitting models to different datasets. Thus, calculation component 111 transforms the "fitting models to different datasets" to common scale (such as, 0-1 range). Model to be used in step 1 can either be, at least, squares regression or quantile regression. However, if the number datasets used by step 1 is large, then there is a need to reduce number of models. Consequently, the reduction in number of models must be done with a way that models can be combined into clusters based on correlation of predictions. Thus, one model per cluster is selected. It is noted that step 1 does not calculate correlation between model coefficients because potential for each dataset model fitted can be different and such comparison does not make sense.

In step 2, calculation component 111 can use test data split from each dataset from step 1 to calculate correlation. For example, applying set of labels those datasets: test_A, test_B and corresponding models: model_A, model_B. Then calculation component 111 can use model_A and model_B to make predictions on datasets test_A and test_B. In the next step, calculation component 111 calculates the correlation between predictions of model_A and model_B. Here, data can be optionally balanced, size of test_A and test_B can be set to be equal.

In step 3, medoid clustering methodology (i.e., k-medoids or partitioning around medoids) is used on transformed data (i.e., correlation data from step 2). Clustering is applied to reduce number of transformation functions. Distance measure used in clustering algorithm will be defined as 1 minus absolute value of correlation coefficient. Number of clusters will be based on maximum distance (default value $D_{max}=0.1$) between elements in cluster. Finally, only transformations corresponding to centers of clusters will be used. Steps 1-3 will be run once, and updates will be made only when set of benchmarking set will be extended.

As is further described herein below, selection component 214 of the present invention provides the capability of selecting the best transformation from consolidate function component 213. Only one transformation will be selected for deployed model and set of defined KPIs for business application. Model predictions for first batch of scoring data will be transformed using subset of functions selected by consolidate function component 213. Correlation of transformed predictions with business process data (used to calculate KPIs) will be calculated. The mean absolute correlation for each transformation will be calculated. Transformation with the highest mean correlation will be selected to calculate transformation used for monitoring by correlation service.

Figure 3:
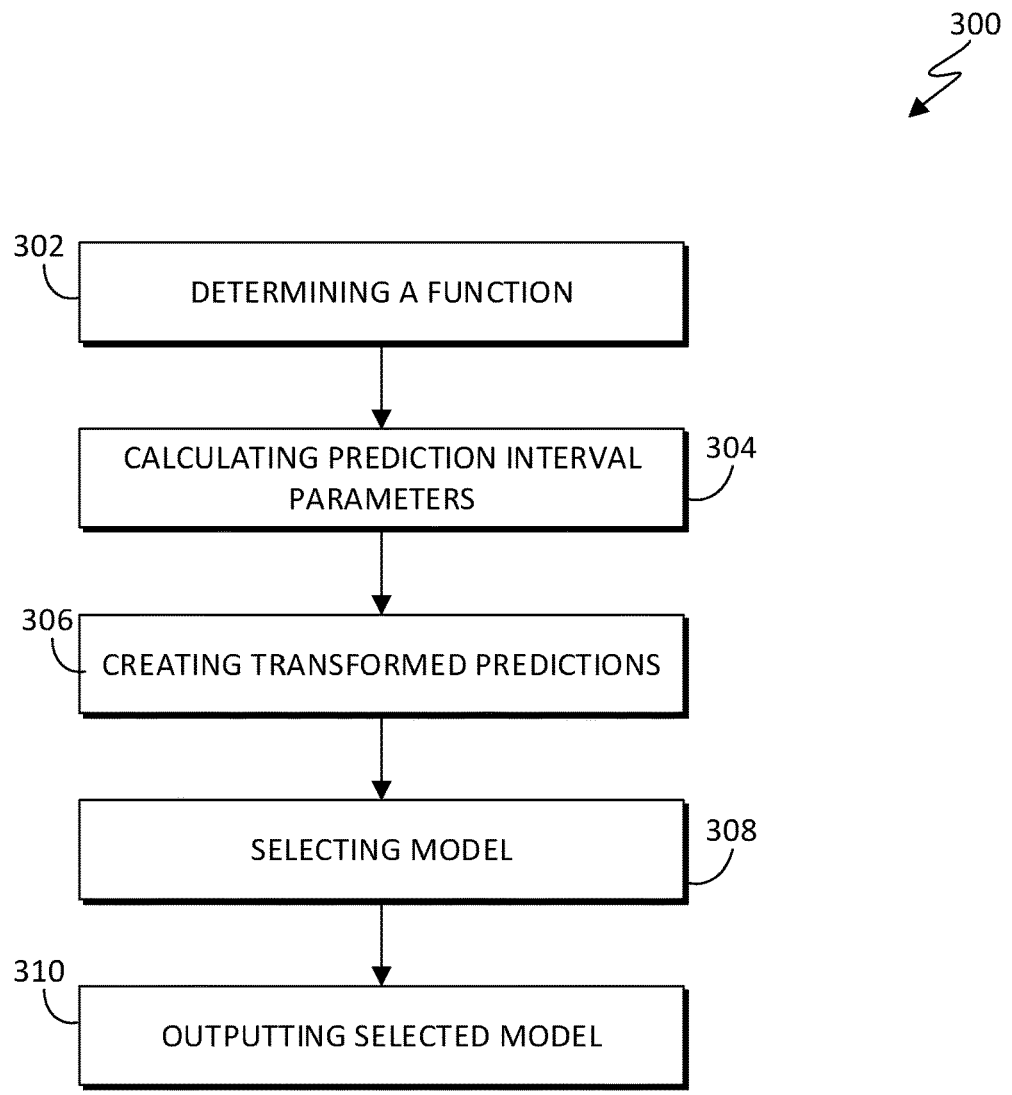
FIG. 3 is a high-level flowchart illustrating the operation of server 110, designated as 300, in accordance with an embodiment of the present invention.

FIG. 3 is a flowchart illustrating the operation of calculation component 111, designated as 300, in accordance with another embodiment of the present invention.

Calculation component 111 determines a function (step 302). In an embodiment, calculation component 111, through function fitting component 211, receives a dataset (e.g., training, sample, etc.) from a database server. For example, the benchmark dataset can be chosen by the user based on the type of business process that the user is trying to model and/or forecast. Furthermore, based on the received dataset, calculation component 111, through function fitting component 211, determines the best fit function. For example, from a set of regression models (e.g., model_A, model_B, model_C, etc.), calculation component 111, through function fitting component 211, choses model_A (i.e., a polynomial function, defined as $y=ax^2+bx+\theta x+c$) after iteratively determines the best fit function.

Calculation component 111 calculates prediction interval parameters (step 304). In an embodiment, calculation component 111, through prediction interval component 212, trains the regression models to predict the prediction intervals. Calculation component 111 can use a simulation approach to train the set of regression models. This approach (i.e., simulation approach) can be utilized on top of the benchmarking dataset to estimate the function parameters. It is noted, depending on the number of regression models being trained, there is an equivalent and corresponding benchmark dataset (and parameters) to the models, respectively. For example, a simulation approach is used to train the regression models (e.g., model_A, model_B, model_C, etc.) from step 302. Furthermore, calculation component 111, through prediction interval component 212, extract parameters from the trained regression models. For example, calculation component 111 extract parameters a, b, and c (excluding the offset term, 0) from model_A. Calculation component 111, through consolidate function component 213, transforms generated values from the trained models into standardized range (i.e., 0 to 1) using coefficients/parameters of the polynomial function: a, b, and c. For example, calculation component 111 normalized parameters from model_A. The normalized parameters are used to provide target for model_B. It is noted that any standardization/normalization of numbers techniques can be used to transform the numbers into a range of zero to one.

Calculation component 111 creates transformed predictions (step 306). In an embodiment, calculation component 111, through consolidate function component 213, calculates the correlation matrix for the normalized parameters. The parameters from the trained models forms a basis for a matrix that is used by calculation component 111 to calculate the correlation matrix between the trained models. The correlation matrix (based on Table 1) represents a transformed prediction using extracted parameters (from each trained models) in an iterative manner (k times). For example, model_A produces parameters (a, b, c) of 1.3, 2 and 0.8, respectively. Model_B produces the parameters of 1.1, 2.5 and 0.7. The variable, k equals one, represents the first trained model and k equals two, presents the parameter values second trained model in Table 1. Furthermore, calculation component 111, through consolidate function component 213, reduces the number of transformation functions by applying the medoid clustering method to the transformed data. Correlations from the prior step are used as inputs for the medoid clustering algorithm. After medoid clustering is performed, the number of clusters are reduced. For example, calculation component 111 uses test data split from each dataset from step 350. The test data a can be called: test_A, test_B and the test dataset corresponds to models, model_A and model_B. Calculation component 111 uses model_A and model_B to make predictions on datasets test_A and test_B. It is noted that data can be optionally balanced, i.e., size of test_A and test_B can be set to be equal. Distances are calculated using correlation and can be defined as $d(x,y)=1-corr(x,y)$.

Calculation component 111 selects a model (step 308). In an embodiment, calculation component 111, through selection component 214, selects the transformation based on the highest mean correlation (calculated from prior step). It is noted that only one transformation will be selected.

Calculation component 111 outputs the selected model (step 310). In an embodiment, calculation component 111, notifies the user of the selected regression model. The user can use the model to monitor and/or train correlation between prediction interval and the KPI (of a business process).

Figure 4:
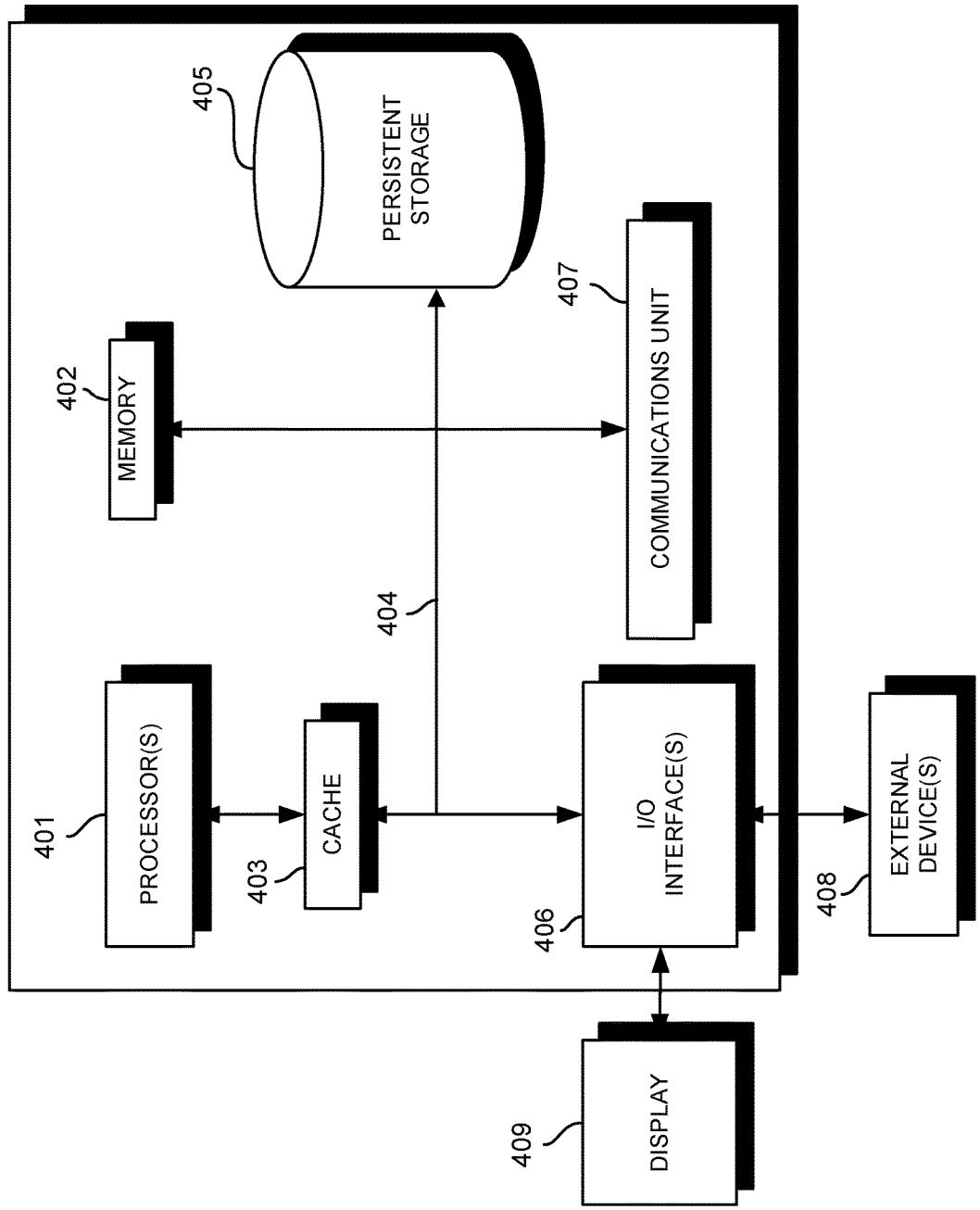
FIG. 4 depicts a block diagram, designated as 400, of components of a server computer capable of executing the calculation component 111 within the serverless environment, of FIG. 1, in accordance with an embodiment of the present invention.

FIG. 4, designated as 400, depicts a block diagram of components of calculation component 111 application, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data x10) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Calculation component 111 can be stored in persistent storage 405 for access and/or execution by one or more of the respective processor(s) 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., Calculation component 111) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., Calculation component 111) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for selecting a transformed prediction model, associated with machine learning, for estimating the uncertainty of prediction relating to a business process without using training datasets, the method comprising:

determining, by a processor, a best-fit function corresponding to a prediction interval based on one or more benchmark datasets, wherein the one or more benchmark datasets is a combination of available open datasets related to a regression problem;

calculating, by the processor, one or more sets of prediction interval parameters associated with the best-fit function based on training a set of regression models with the one or more benchmark datasets, further comprises:

training the set of regression models based on a simulation approach;

extracting the one or more sets of prediction interval parameters from the set of regression models;

normalizing the one or more sets of prediction interval parameters;

splitting the one or more benchmark datasets into one or more subset benchmarks datasets; and determining correlation between the one or more subset benchmarks dataset and the set of regression models;

creating, by the processor, one or more transformed predictions based on the one or more sets of parameters and based on a logical distance;

selecting, by the processor, a transformed prediction model based on a mean absolute correlation from the one or more transformed predictions; and updating, by the processor, the best-fit function based on the identified one or more subset benchmark datasets and the normalized one or more sets of prediction interval parameters that are below a threshold;

determining, by the processor, the selected transformed prediction model, wherein the selected transformed prediction model is used to monitor and train correlation between the prediction interval and KPIs (Key Performance Indicator) of the business process; and identify and removing, by the processor, correlations between the prediction interval and KPIs (Key Performance Indicator) that are under a threshold.

2. The computer-implemented method of claim 1, wherein the one or more benchmarking datasets are retrieved from Kaggle competitions.

3. The computer-implemented method of claim 1, wherein determining the best-fit function further comprises: iteratively applying, a polynomial function against the dataset until the best-fit function is selected based on an exit criterion, wherein the exit criterion is a mean square root formula.

4. The computer-implemented method of claim 1, further comprising:

balancing the one or more subset benchmarks datasets by setting the size of the one or more subset benchmarks dataset to equal to each other.

5. The computer-implemented method of claim 1, wherein the logical distance is calculated based on an correlation formula, $d(x,y)=1-corr(x,y)$, wherein $d(x,y)$ is a distance function and $corr(x, y)$ is a correlation function and x and y are unknown variables.

6. The computer-implemented method of claim 1, wherein creating the one or more transformed predictions based on the one or more sets of parameters and based on a logical distance further comprises:

calculating a correlation matrix between the normalized one or more sets of prediction interval parameters, wherein the correlation matrix represents the one or more transformed predictions;

reducing the one or more transformed predictions by applying medoid clustering technique.

7. The computer-implemented method of claim 1, wherein selecting the transformed prediction model based on the mean absolute correlation from the one or more transformed predictions further comprises:

calculating the mean absolute correlation value between the one or more transformed predictions against a business process data; and selecting the one or more transformed predictions with a highest mean absolute correlation value from the calculated mean absolute correlation value.

8. A computer program product for selecting a transformed prediction model, associated with machine learning, for estimating the uncertainty of prediction relating to a business process without using training datasets, the computer program product comprising:

one or more computer readable storage media and program instructions stored on the one or more computer readable storage media, the stored program instructions comprising:

program instructions to determine a best-fit function corresponding to a prediction interval based on one or more benchmark datasets, wherein the one or more benchmark datasets is a combination of available open datasets related to a regression problem;

program instructions to calculate one or more sets of prediction interval parameters associated with the best-fit function based on training a set of regression models with the one or more benchmark datasets, further comprises:

program instructions to train the set of regression models based on a simulation approach;

program instructions to extract the one or more sets of prediction interval parameters from the set of regression models;

program instructions to normalize the one or more sets of prediction interval parameters;

program instructions to split the one or more benchmark datasets into one or more subset benchmarks datasets: and program instructions to determine correlation between the one or more subset benchmarks dataset and the set of regression models;

program instructions to create one or more transformed predictions based on the one or more sets of parameters and based on a logical distance;

program instructions to select a transformed prediction model based on a mean absolute correlation from the one or more transformed predictions;

program instructions to update the best-fit function based on the identified one or more subset benchmark datasets and the normalized one or more sets of prediction interval parameters that are below a threshold;

program instructions to determine the selected transformed prediction model, wherein the selected transformed prediction model is used to monitor and train correlation between the prediction interval and KPIs (Key Performance Indicator) of the business process; and program instructions to identify and remove correlations between the prediction interval and KPIs (Key Performance Indicator) that are under a threshold.

9. The computer program product of claim 8, wherein the one or more benchmark datasets are retrieved from Kaggle competitions.

10. The computer program product of claim 8, wherein determining the best-fit function further comprises:
program instructions to iteratively apply, a polynomial function against the dataset until the best-fit function is selected based on an exit criterion, wherein the exit criterion is a mean square root formula.

11. The computer program product of claim 8, further comprising:
program instructions to balance the one or more subset benchmarks datasets by setting the size of the one or more subset benchmarks dataset to equal to each other.

12. The computer program product of claim 8, wherein the logical distance is calculated based on an correlation formula, $d(x,y)=1-corr(x,y)$, wherein $d(x,y)$ is a distance function and $corr(x, y)$ is a correlation function and x and y are unknown variables.

13. The computer program product of claim 8, wherein program instructions to create the one or more transformed predictions based on the one or more sets of parameters and based on a logical distance further comprises:
program instructions to calculate a correlation matrix between the normalized one or more sets of prediction interval parameters, wherein the correlation matrix represents the one or more transformed predictions; and
program instructions to reduce the one or more transformed predictions by applying medoid clustering technique.

14. The computer program product of claim 8, wherein program instructions to select the transformed prediction model based on the mean absolute correlation from the one or more transformed predictions further comprises:
program instructions to calculate the mean absolute correlation value between the one or more transformed predictions against a business process data; and
program instructions to select the one or more transformed predictions with a highest mean absolute correlation value from the calculated mean absolute correlation value.

15. A computer system for selecting a transformed prediction model, associated with machine learning, for estimating the uncertainty of prediction relating to a business process without using training datasets, the computer system comprising:
one or more computer processors;
one or more computer readable storage media;
program instructions stored on the one or more computer readable storage media for execution by at least one of the one or more computer processors, the program instructions comprising:
program instructions to determine a best-fit function corresponding to a prediction interval based on one or more benchmark datasets, wherein the one or more benchmark datasets is a combination of available open datasets related to a regression problem;
program instructions to calculate one or more sets of prediction interval parameters associated with the best-fit function based on training a set of regression models with the one or more benchmark datasets, further comprises:
program instructions to train the set of regression models based on a simulation approach;
program instructions to extract the one or more sets of prediction interval parameters from the set of regression models;
program instructions to normalize the one or more sets of prediction interval parameters;
program instructions to split the one or more benchmark datasets into one or more subset benchmarks datasets; and
program instructions to determine correlation between the one or more subset benchmarks dataset and the set of regression models;
program instructions to create one or more transformed predictions based on the one or more sets of parameters and based on a logical distance;
program instructions to select a transformed prediction model based on a mean absolute correlation from the one or more transformed predictions;
program instructions to update the best-fit function based on the identified one or more subset benchmark datasets and the normalized one or more sets of prediction interval parameters that are below a threshold;
program instructions to determine the selected transformed prediction model, wherein the selected transformed prediction model is used to monitor and train correlation between the prediction interval and KPIs (Key Performance Indicator) of the business process; and
program instructions to identify and remove correlations between the prediction interval and KPIs (Key Performance Indicator) that are under a threshold.

16. The computer system of claim 15, wherein determining the best-fit function further comprises:
program instructions to iteratively apply, a polynomial root function against the dataset until the best-fit function is selected based on an exit criterion, wherein the exit criterion is a mean square root formula.

17. The computer system of claim 15, further comprising:
program instructions to balance the one or more subset benchmarks datasets by setting the size of the one or more subset benchmarks dataset to equal to each other.

18. The computer system of claim 15, wherein the logical distance is calculated based on an correlation formula, $d(x,y)=1-corr(x,y)$, wherein $d(x,y)$ is a distance function and $corr(x, y)$ is a correlation function and x and y are unknown variables.

19. The computer system of claim 15, wherein program instructions to create the one or more transformed predictions based on the one or more sets of parameters and based on a logical distance further comprises:
program instructions to calculate a correlation matrix between the normalized one or more sets of prediction interval parameters, wherein the correlation matrix represents the one or more transformed predictions; and
program instructions to reduce the one or more transformed predictions by applying medoid clustering technique.

20. The computer system of claim 15, wherein program instructions to select the transformed prediction model based on the mean absolute correlation from the one or more transformed predictions further comprises:
program instructions to calculate the mean absolute correlation value between the one or more transformed predictions against a business process data; and
program instructions to select the one or more transformed predictions with a highest mean absolute correlation value from the calculated mean absolute correlation value.

* * * * *